US012679234B2

(12) United States Patent
Choi

(10) Patent No.: US 12,679,234 B2
(45) Date of Patent: Jul. 14, 2026

(54) CHARGING STATION RECOMMENDATION APPARATUS AND METHOD THEREOF

(71) Applicants: Hyundai Motor Company, Seoul (KR); Kia Corporation, Seoul (KR)

(72) Inventor: Eup Jung Choi, Suwon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 925 days.

(21) Appl. No.: 17/979,611

(22) Filed: Nov. 2, 2022

(65) Prior Publication Data

US 2023/0311684 A1     Oct. 5, 2023

(30) Foreign Application Priority Data

Apr. 5, 2022     (KR) ........................ 10-2022-0042189

(51) Int. Cl.
B60L 53/30          (2019.01)
B60L 53/66          (2019.01)
G01C 21/34          (2006.01)

(52) U.S. Cl.
CPC ............. B60L 53/305 (2019.02); B60L 53/66 (2019.02); G01C 21/3407 (2013.01)

(58) Field of Classification Search
CPC .................................................... B60L 53/305

USPC ........................................................ 320/109
See application file for complete search history.

(56) References Cited

U.S. PATENT DOCUMENTS

2011/0224900 A1* 9/2011 Hiruta ................ G01C 21/3469
                                                        701/533
2014/0316939 A1* 10/2014 Uyeki ........................ B60L 3/12
                                                        705/26.9
2015/0158393 A1* 6/2015 Kawano ................. G06Q 10/04
                                                        320/109
2022/0055496 A1* 2/2022 Barber ................... H02J 7/0047

FOREIGN PATENT DOCUMENTS

WO      WO-2020049364 A2 * 3/2020 ............. G06Q 50/06

* cited by examiner

*Primary Examiner* — Jerry D Robbins
(74) *Attorney, Agent, or Firm* — Fox Rothschild LLP

(57)          ABSTRACT

Disclosed are a charging station recommendation apparatus and a method thereof. The charging station recommendation apparatus includes a data collection device that collects vehicle data of a vehicle charged by at least one charging station at least once for each driver of the vehicle, a data processing device that generates driver charging information and/or vehicle charging information based on the collected vehicle data, and a data application device that recommends an optimal charging station based on the driver charging information and/or the vehicle charging information.

18 Claims, 13 Drawing Sheets

810

● DEPARTURE
○ CHARGING STATION
✕ CANDIDATE CHARGING STATION
● DESTINATION
──▶ DEPARTURE/DESTINATION STRAIGHT PATH

CHARGING STATION RECOMMENDATION APPARATUS AND METHOD THEREOF

CROSS-REFERENCE TO RELATED APPLICATION

This application claims under 35 U.S.C. § 119(a) the benefit of and priority to Korean Patent Application No. 10-2022-0042189, filed in the Korean Intellectual Property Office on Apr. 5, 2022, the entire contents of which are incorporated herein by reference.

BACKGROUND

1. Technical Field

The present disclosure relates to a charging station recommendation apparatus and method, and more particularly, to a technology for recommending a charging station by reflecting a tendency of a driver.

2. Background

Recently, interest in electric vehicles and hybrid vehicles has been increased in order to reduce carbon emissions. In general, an electric vehicle (EV) refers to a vehicle using a battery and a motor without using petroleum fuel and an engine.

Such an electric vehicle may provide a nearby charging station search function to the driver based on a current location, destination, and the like and may automatically provide a route including a charging station when a route to the destination is set.

Meanwhile, when a route including a charging station is provided to a driver, the tendency of the driver is not reflected, and the driver has no choice but to passively follow the route provided by the vehicle.

SUMMARY

The present disclosure has been made to solve the above-mentioned problems occurring in the related art while advantages achieved by the related art are maintained intact.

An aspect of the present disclosure provides a charging station recommendation apparatus and method capable of providing an optimal route via a charging station to a driver in consideration of an individual tendency of each driver.

Another aspect of the present disclosure provides a charging station recommendation apparatus and method in which a system automatically realizes a driver's tendency without receiving an input from a driver and provides an optimal route via a charging station via route to the driver.

Still another aspect of the present disclosure provides a charging station recommendation apparatus and method capable of providing an optimal route via a charging station to a driver by diversifying a driver tendency reflection scheme according to path conditions.

The technical problems to be addressed by the present disclosure are not limited to the aforementioned problems, and any other technical problems not mentioned herein will be clearly understood from the following description by those skilled in the art to which the present disclosure pertains.

According to an aspect of the present disclosure, a charging station recommendation apparatus includes a data collection device that collects vehicle data of a vehicle charged by at least one charging station at least once, a data processing device that generates driver charging information and/or vehicle charging information based on the collected vehicle data, and a data application device that recommends an optimal charging station based on the driver charging information and/or the vehicle charging information.

According to an embodiment, the data collection device may obtain the vehicle data from a time point when a charging connector is coupled to the vehicle to a time point when the charging connector is separated from the vehicle, wherein the vehicle data may include at least one of charging start time, charging completion time, a remaining battery level, an estimated battery exhaustion distance, a remaining hydrogen amount, a remaining driving distance, a charger type, a type of the vehicle, model year of the vehicle, and/or a total driving distance of the vehicle.

According to an embodiment, the driver charging information may include at least one of: a charger type preferred by the driver, a charger connector type preferred by the driver, an estimated average battery exhaustion distance at a time point when charging of the vehicle is started according to the driver, and/or an average charging time of the vehicle according to the driver, and the vehicle charging information may include at least one of: the estimated average battery exhaustion distance at the time point when the charging of the vehicle is started, and/or the average charging time of the vehicle according to at least one of: a type of the vehicle, model year of the vehicle, and/or a total driving distance of the vehicle.

According to an embodiment, the data application device may determine the optimal charging station from among a plurality of charging stations located in a range that is within a threshold angle left and right based on a straight path between a current location and a destination of the vehicle or the current location and a waypoint of the vehicle.

According to an embodiment, the charging station recommendation apparatus may further include a data storage that stores at least one of: the driver charging information and/or the vehicle charging information, wherein the data storage may store driver charging information of each driver of a plurality of drivers of the vehicle, and wherein the data application device may recommend the optimal charging station based on driver charging information of a first driver stored in the data storage in response to selecting the first driver from among the plurality of drivers.

According to an embodiment, the data application device is configured to provide data for recommending charging of the vehicle when it is determined that charging is necessary before a next driving event based on an estimated battery exhaustion distance of the vehicle and the driver charging information after the vehicle arrives at either one of a destination or a waypoint.

According to an embodiment, the data application device may determine that the charging is necessary if the estimated battery exhaustion distance of the vehicle is less than the estimated average battery exhaustion distance at a time point when charging of the vehicle is started according to the driver charging information, and the data for recommending charging may include at least one of: sound data and/or screen data for recommending charging.

According to an embodiment, the data processing device may assign different values to first vehicle data and second vehicle data from among the vehicle data collected at least once, the second vehicle data being collected after the first vehicle data; and generate the driver charging information and/or the vehicle charging information based on the values assigned to the first vehicle data and the second vehicle data.

According to an embodiment, the data application device may recommend the optimal charging station if an estimated battery exhaustion distance of the vehicle is less than: a distance between a current location of the vehicle and a destination of the vehicle and/or the current location of the vehicle and a waypoint of the vehicle.

According to an embodiment, if it is determined: (a) that the vehicle needs to be charged twice or more, (b) a distance between a current location of the vehicle and a destination of the vehicle is equal to or greater than a threshold distance, and/or (c) the current location of the vehicle and a waypoint of the vehicle is equal to or greater than a threshold distance, the data application device may determine an additional charging station by using charging information for each type of vehicle generated based on at least one of: an average model year of another vehicle of a same type as the vehicle and/or an average total driving distance of the another vehicle, and recommend the additional charging station in addition to the optimal charging station.

According to another aspect of the present disclosure, a method of recommending a charging station includes collecting, by a data collection device, vehicle data of a vehicle charged by at least one charging station at least once, generating, by a data processing device, driver charging information and/or vehicle charging based on the collected vehicle data, and recommending, by a data application device, an optimal charging station based on the driver charging information and/or the vehicle charging information.

According to an embodiment, the collecting vehicle data of the vehicle step includes: obtaining, by the data collection device, the vehicle data from a time point when a charging connector is coupled to the vehicle to a time point when the charging connector is separated from the vehicle, wherein the vehicle data includes at least one of charging start time, charging completion time, a remaining battery level, an estimated battery exhaustion distance, a remaining hydrogen amount, a remaining driving distance, a charger type, a type of the vehicle, a model year of the vehicle, and/or a total driving distance of the vehicle.

According to an aspect of the present disclosure, the driver charging information may include at least one of a charger type preferred by the driver, a charger connector type preferred by the driver, an estimated average battery exhaustion distance at a time point when charging of the vehicle is started according to the driver, and/or an average charging time of the vehicle according to the driver, wherein the vehicle charging information may include at least one of: the estimated average battery exhaustion distance at the time point when the charging of the vehicle is started, and/or the average charging time of the vehicle, according to at least one of: a type of the vehicle, a model year of the vehicle, and/or a total driving distance of the vehicle.

According to an aspect of the present disclosure, the recommending of the optimal charging station step may include determining, by the data application device, the optimal charging station from among a plurality of charging stations located in a range that is within a threshold angle left and right based on a straight path between a current location and a destination of the vehicle or the current location and a waypoint of the vehicle.

According to an aspect of the present disclosure, the method may further include storing, by a data storage, at least one of the driver charging information and/or the vehicle charging information, wherein the recommending of the optimal charging station step includes recommending, by the data application device, the optimal charging station based on driver charging information of a first driver stored in the data storage in response to selecting the first driver from among the plurality of drivers.

According to an aspect of the present disclosure, the method may further include providing, the data application device, data for recommending charging of the vehicle when it is determined that charging is necessary before a next driving event based on an estimated battery exhaustion distance of the vehicle and the driver charging information after the vehicle arrives at either one of: a destination or a waypoint.

According to an aspect of the present disclosure, the providing of the data for recommending charging to the vehicle may include determining, by the data application device, that the charging is necessary if the estimated battery exhaustion distance of the vehicle is less than an estimated average battery exhaustion distance at a time point when charging of the vehicle is started according to the driver charging information, wherein the data for recommending charging may include at least one of: sound data and/or screen data for recommending charging.

According to an aspect of the present disclosure, the generating of the at least one of the driver charging information of the vehicle or the vehicle charging information may include assigning, by the data processing device, different values to first vehicle data and second vehicle from among the vehicle data collected at least once, the second vehicle data being collected after the first vehicle data and generating, by the data processing device, the driver charging information and/or the vehicle charging information based on the values assigned to the first vehicle data and the second vehicle data.

According to an aspect of the present disclosure, the recommending of the optimal charging station to the vehicle may include recommending, by the data application device, the optimal charging station if an estimated battery exhaustion distance of the vehicle is less than: a distance between a current location of the vehicle and a destination of the vehicle and/or the current location of the vehicle and a waypoint of the vehicle.

According to an aspect of the present disclosure, the method may further include, if it is determined: (a) that the vehicle needs to be charged twice or more, (b) a distance between a current location of the vehicle and a destination of the vehicle is equal to or greater than a threshold distance, and/or (c) the current location of the vehicle and a waypoint of the vehicle is equal to or greater than a threshold distance, determining, by the data application device, an additional charging station by using charging information for each type of vehicle generated based on at least one of: an average model year of another vehicle of a same type as the vehicle and/or an average total driving distance of the another vehicle, and recommending, by the data application device, the additional charging station in addition to the optimal charging station to the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
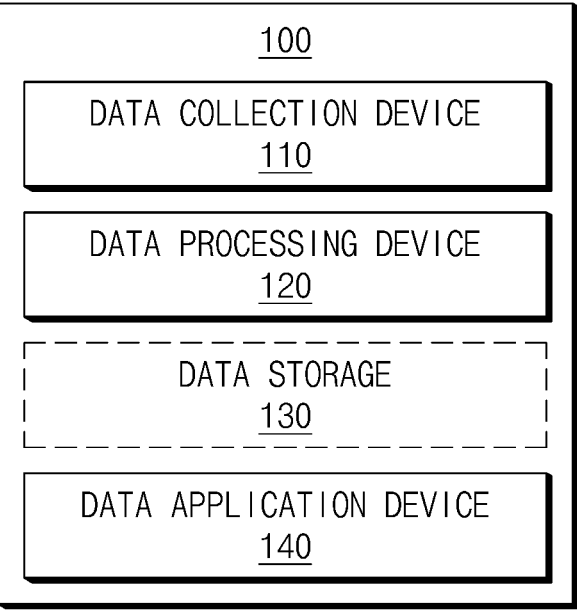
FIG. 1 is a block diagram illustrating a charging station recommendation apparatus according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 13.

FIG. 1 is a block diagram illustrating a charging station recommendation apparatus 100 according to an embodiment of the present disclosure.

Referring to FIG. 1, the charging station recommendation apparatus 100 according to an embodiment may include a data collection device 110, a data processing device 120, data storage 130, and a data application device 140. In various embodiments, the charging station recommendation apparatus 100 may include additional components in addition to the components illustrated in FIG. 1, or may omit at least one of the components illustrated in FIG. 1.

According to an embodiment, the data collection device 110, the data processing device 120, the data storage 130, and the data application device 140 may be controlled by at least one processor (not shown) included in the charging station recommendation apparatus 100.

According to an embodiment, the processor (not shown) may be electrically connected to the data collection device 110, the data processing device 120, the data storage 130 and the data application device 140, may electrically control each component, and may be an electric circuit executing a command of software, thereby performing various data processing and calculations to be described below.

According to various embodiments, the vehicle in this document may include a hydrogen car, an electric vehicle, a plug-in hybrid electric vehicle (PHEV), and the like. However, the present disclosure is not limited thereto and may include various types of charging vehicles.

Hereinafter, a car or vehicle described below means an electric vehicle unless otherwise specified, but does not exclude a car or vehicle that performs various types of charging.

According to an embodiment, the data collection device 110 may collect vehicle data of a vehicle that is charged at at least one charging station.

According to an embodiment, the data collection device 110 may collect vehicle data of each driver of the vehicle once or more corresponding to a selected driver. For example, the data collection device 110 may collect personalized vehicle data for each vehicle driver once or more.

According to an embodiment, the data collection device 110 may receive vehicle data from one or more charging stations through a wired/wireless network in real time.

For example, the data collection device 110 may receive vehicle data in seconds from one or more charging stations through a wired/wireless network.

According to an embodiment, the data collection device 110 may obtain the vehicle data from a time point when a charging connector is coupled to the vehicle to a time point when the charging connector is separated from the vehicle.

According to an embodiment, the vehicle data may include at least one of whether the charging connector is coupled, charging start time, charging completion time, charging time, a remaining battery level (state of charge (SoC)) at the start of charging, a remaining battery level at the end of charging, an estimated battery exhaustion distance (distance to empty (DTE)) at the start of charging, an estimated battery exhaustion distance at the end of charging, a remaining hydrogen amount, a remaining driving distance, a charger type, a vehicle type, model year of a vehicle, or a total driving distance of a vehicle.

For example, the charger type may include at least one of a super-fast type, a rapid type, or a slow type.

According to an embodiment, the data collection device 110 may store the collected vehicle data in the data storage 130 for each driver. According to an embodiment, the data collection device 110 may transmit the collected data to a central management server.

According to an embodiment, the data processing device 120 may generate driver charging information based on the vehicle data. Hereinafter, in the present disclosure, the driver charging information may be referred to as driver tendency information.

According to an embodiment, the data processing device 120 may generate vehicle charging information based on the vehicle data.

According to an embodiment, the vehicle charging information may include at least one of an estimated average battery exhaustion distance at the time point when charging of the vehicle is started or average required charging time of the vehicle according to at least one of the vehicle type, the model year of the vehicle, or the total driving distance of the vehicle.

According to an embodiment, the data processing device 120 may derive (or obtain) at least one of a driver's individual tendency or an average tendency for each vehicle type by processing the collected vehicle data.

According to an embodiment, the data processing device 120 may obtain a driver's individual tendency by processing only the vehicle data for a selected driver among the collected vehicle data.

According to an embodiment, the data processing device 120 may obtain the driver's individual tendency based on at least one of the charging start time, the charging completion time, the required charging time, the remaining battery level at the start of charging, the remaining battery level at the end of charging, the estimated battery exhaustion distance at the start of charging, the estimated battery exhaustion distance at the end of charging, or a charger type for the selected driver.

According to an embodiment, the data processing device 120 may assign separate values to the first vehicle data and the second vehicle data collected after the first vehicle data is collected among the vehicle data collected once or more, and may obtain the driver's individual tendency according to the values assigned to the first vehicle data and the second vehicle data.

According to an embodiment, the data processing device 120 may assign (or allocate) a high weight to recently collected vehicle data. In detail, the data processing device 120 may assign a higher (or larger) value to the second vehicle data collected after the first vehicle data is collected than the first vehicle data.

According to the above-described embodiment, the charging station recommendation apparatus according to the present disclosure may follow a change in driver's tendency by assigning (or allocating) a high weight to recently collected vehicle data.

According to an embodiment, the data processing device 120 may derive an average tendency for each vehicle type by classifying and processing the vehicle data collected at at least one charging station by vehicle type.

According to an embodiment, the data processing device 120 may process the collected vehicle data transmitted to a central management server.

According to an embodiment, the data processing device 120 may classify the collected vehicle data based on the model year of the vehicle or the total driving distance of the vehicle for the same vehicle type.

According to an embodiment, the data processing device 120 may obtain the average tendency for each vehicle type based on the vehicle data classified based on the model year of the vehicle or the total driving distance of the vehicle for the same vehicle type.

For example, the data processing device 120 may obtain the average tendency for each vehicle type based on vehicle data including at least one of the remaining battery level, the estimated battery exhaustion distance, the required charging time, or the charger type.

According to an embodiment, the data storage 130 may store processed data to be used for route search. For example, the processed data to be used for route search may include at least one of the driver charging information or the vehicle charging information.

According to an embodiment, when there are a plurality of drivers of the vehicle, the data storage 130 may store the driver charging information for the plurality of drivers for each driver.

According to an embodiment, the data application device 140 may recommend an optimal charging station to the vehicle based on at least one of the driver charging information or the vehicle charging information.

According to an embodiment, after at least one of the vehicle destination and the vehicle waypoint is set, the data application device 140 may determine whether it is possible to reach at least one of the destination or the waypoint based on at least one of the vehicle data, information on the destination, or information on the waypoint.

According to an embodiment, when the estimated battery exhaustion distance of the vehicle is less than the distance between the current location of the vehicle and the destination or the current location of the vehicle and the waypoint, the data application device 140 may determine that it is impossible to reach at least one of the destination or waypoint.

For example, the distance between the current location and the destination of the vehicle or the current location and the waypoint of the vehicle may include the driving distance between the current location and the destination of the vehicle or the current location and the waypoint of the vehicle.

According to an embodiment, the data application device 140 may recommend an optimal charging station to the vehicle when the estimated battery exhaustion distance of the vehicle is less than the distance between the current location and the destination of the vehicle or the current location and the waypoint of the vehicle.

According to an embodiment, the data application device 140 may select, as a candidate charging station, at least one charging station among the plurality of charging stations, which is located within a threshold angle (e.g., 30 degrees) left and right based on the straight path from the current location of the vehicle to the destination or from the current location of the vehicle to the waypoint.

According to an embodiment, the data application device 140 may determine an optimal charging station among at least one candidate charging station, based on at least one of the driver charging information and the vehicle charging information.

According to an embodiment, when there are a plurality of drivers of the vehicle, the data application device 140 may recommend an optimal charging station based on the driver charging information of the first driver in response to selecting the first driver from among the plurality of drivers.

For example, the data application device 140 may recommend an optimal charging station based on the driver charging information of the first driver among the driver charging information for the plurality of drivers stored in the data storage 130.

In addition, for example, the data application device 140 may obtain the driver charging information of the first driver among the driver charging information for the plurality of drivers from the server, and recommend an optimal charging station based on the driver charging information of the first driver.

According to an embodiment, after the vehicle arrives at at least one of a destination or a waypoint, when it is determined that charging is required before the next driving based on the estimated battery exhaustion distance and driver charging information of the vehicle, the data application device 140 may provide data for recommending charging to the vehicle.

For example, the data for recommending charging may include at least one piece of sound or screen data for recommending charging.

According to an embodiment, after at least one of the destination or waypoint of the vehicle is set, when it is determined that the vehicle is required to be charged twice or more, the data application device 140 may determine whether the distance to the destination or waypoint is equal to or greater than a threshold distance.

According to an embodiment, when it is determined that the vehicle is required to be charged twice or more to reach the destination or waypoint of the vehicle, or the distance to the destination or waypoint is equal to or greater than a threshold distance, the data application device 140 may additionally recommend the charging station determined based on the charging information for each type of vehicle to the vehicle.

For example, the charging information for each type of vehicle may include information generated based on at least one of the average age of other vehicles of the same type as the host vehicle or the average total driving distance of other vehicles of the same type as the host vehicle.

Figure 2:
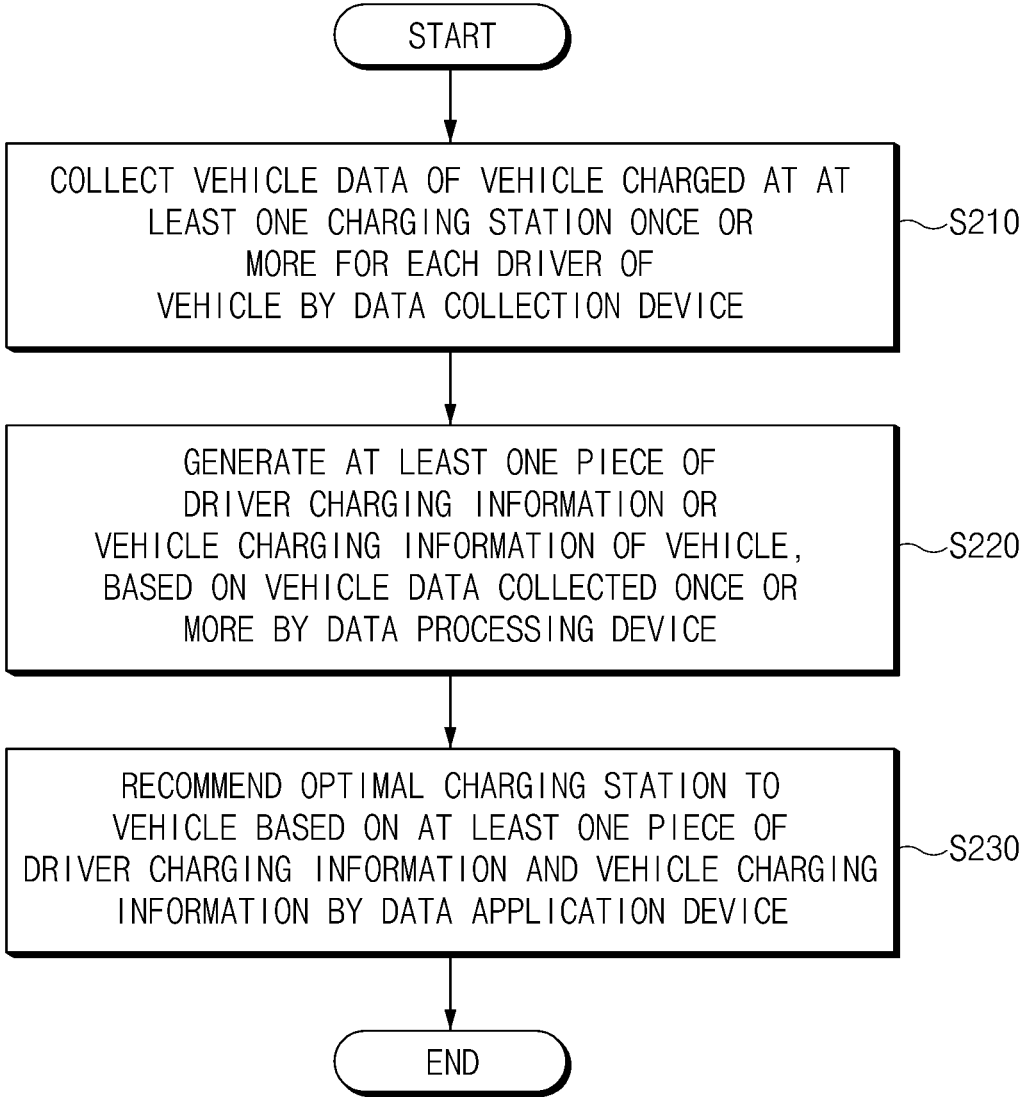
FIG. 2 is a flowchart illustrating a method of recommending a charging station according to an embodiment of the present disclosure.

FIG. 2 is a flowchart illustrating a method of recommending a charging station according to an embodiment of the present disclosure. In the following embodiment, operations of S210 to S230 may be sequentially performed, but are not necessarily performed sequentially. For example, the order of each operation may be changed, and at least two operations may be performed in parallel. In addition, contents corresponding to or overlapping with the contents described above with respect to FIG. 2 may be briefly described or omitted.

Referring to FIG. 2, in the charging station recommendation apparatus and method according to an embodiment, the data collection device may collect vehicle data of a vehicle charged at at least one charging station once or more for each driver of the vehicle in S210.

According to an embodiment, the data collection device may collect the vehicle data of the vehicle that is charged at at least one charging station.

According to an embodiment, the vehicle data may be obtained from a time point when a charging connector is coupled to the vehicle to a time point when the charging connector is separated from the vehicle.

According to an embodiment, the data collection device may collect vehicle data for each driver of the vehicle once or more corresponding to selecting the vehicle driver.

According to an embodiment, the vehicle data may include at least one of whether the charging connector is coupled, charging start time, charging completion time, charging time, a remaining battery level (state of charge (SoC)) at the start of charging, a remaining battery level at the end of charging, an estimated battery exhaustion distance (distance to empty (DTE)) at the start of charging, an estimated battery exhaustion distance at the end of charging, a remaining hydrogen amount, a remaining driving distance, a charger type, a vehicle type, model year of a vehicle, or a total driving distance of a vehicle.

According to an embodiment, the data collection device may store the collected vehicle data in the data storage for each driver. According to an embodiment, the data collection device may transmit the collected data to the central management server.

According to an embodiment, in the charging station recommendation apparatus and method, the data processing device may generate at least one piece of the driver charging information or vehicle charging information of the vehicle, based on the vehicle data collected once or more in S220.

According to an embodiment, the data processing device may generate the vehicle charging information based on the vehicle data.

According to an embodiment, the vehicle charging information may include an estimated average battery exhaustion distance at the time point when charging of the vehicle is started or average required charging time of the vehicle according to at least one of the vehicle type, the model year of the vehicle, or the total driving distance of the vehicle.

According to an embodiment, the data processing device may obtain at least one of a driver's individual tendency or an average tendency for each vehicle type by processing the collected vehicle data.

According to an embodiment, the data processing device may obtain the driver's individual tendency by processing only the vehicle data for a selected driver among the collected vehicle data.

According to an embodiment, the data processing device may obtain the driver's individual tendency based on at least one of the charging start time, the charging completion time, the required charging time, the remaining battery level at the start of charging, the remaining battery level at the end of charging, the estimated battery exhaustion distance at the start of charging, the estimated battery exhaustion distance at the end of charging, or a charger type for the selected driver.

According to an embodiment, the data processing device may derive the average tendency for each vehicle type by classifying and processing the vehicle data collected at at least one charging station by vehicle type.

According to an embodiment, the data processing device may classify the collected vehicle data based on the model year of the vehicle or the total driving distance of the vehicle for the same vehicle type.

According to an embodiment, the data processing device may obtain the average tendency for each vehicle type based on at least one of the remaining battery level, the estimated battery exhaustion distance, the required charging time, or the charger type which are classified based on the model year of the vehicle or the total driving distance of the vehicle for the same vehicle type.

According to an embodiment, in the charging station recommendation apparatus and method, the data application device may recommend an optimal charging station to the vehicle based on at least one piece of the driver charging information and the vehicle charging information in S230.

According to an embodiment, the data application device may select, as a candidate charging station, at least one charging station among the plurality of charging stations, which is located within a threshold angle (e.g., 30 degrees) left and right based on the straight path from the current location of the vehicle to the destination or from the current location of the vehicle to the waypoint.

According to an embodiment, after at least one of the vehicle destination and the vehicle waypoint is set, when it is determined that it is impossible to reach at least one of the destination or the waypoint, the data application device may recommend a charging station to the vehicle.

For example, when the estimated battery exhaustion distance of the vehicle is less than the distance between the current location of the vehicle and the destination or the current location of the vehicle and the waypoint, the data application device may determine that it is impossible to reach at least one of the destination or waypoint.

According to an embodiment, when there are a plurality of drivers of the vehicle, the data application device may recommend an optimal charging station based on the driver charging information of the first driver in response to selecting the first driver from among the plurality of drivers.

According to an embodiment, after the vehicle arrives at at least one of a destination or a waypoint, when it is determined that charging is required before the next driving based on the estimated battery exhaustion distance and driver charging information of the vehicle, the data application device may provide data for recommending charging to the vehicle.

According to an embodiment, when it is determined that the vehicle is required to be charged twice or more to reach the destination or waypoint of the vehicle, or the distance to the destination or waypoint is equal to or greater than a threshold distance, the data application device may additionally recommend the charging station determined based on the charging information for each type of vehicle to the vehicle.

Figure 3:
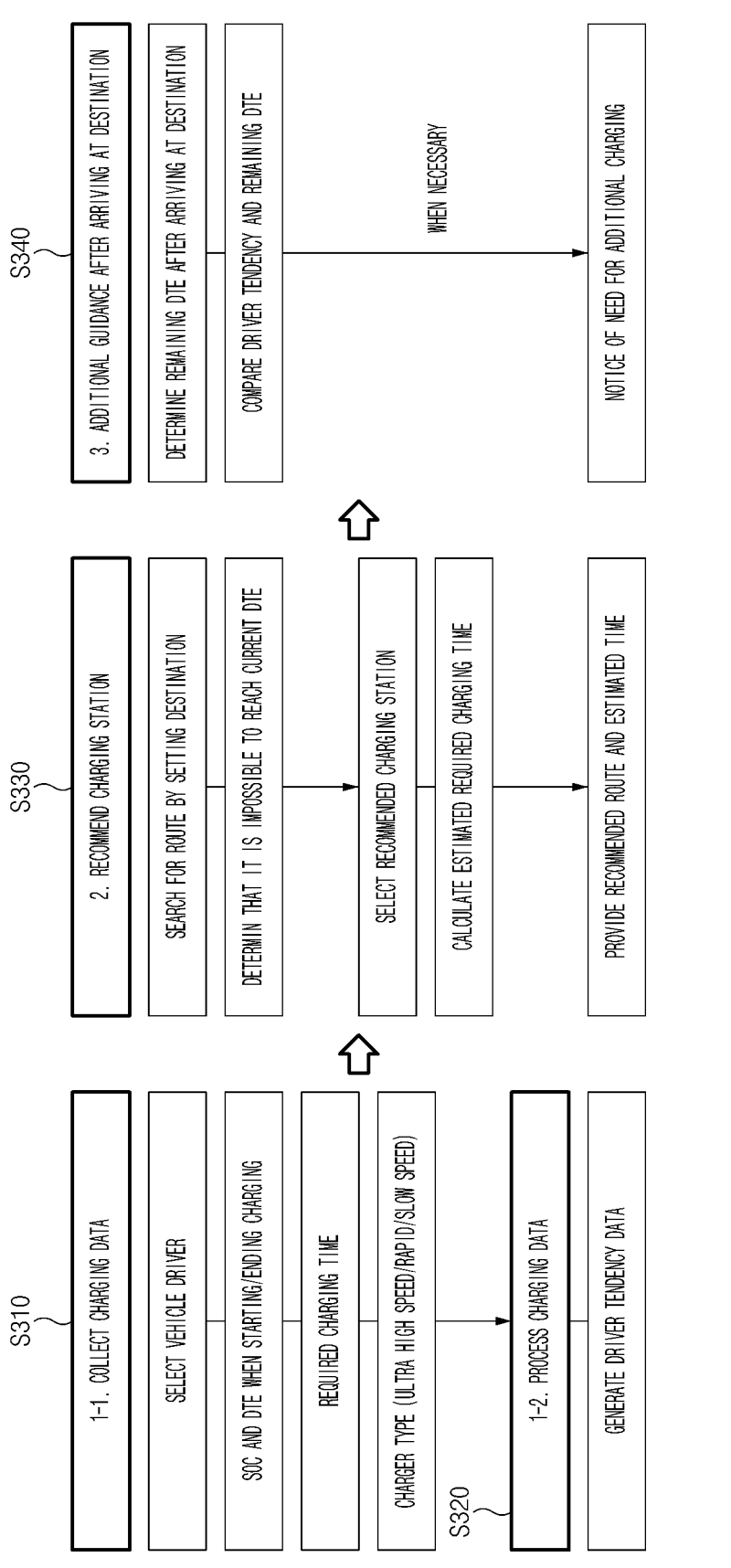
FIG. 3 illustrates recommending a charging station using tendency data of a driver in a charging station recommendation apparatus and method according to an embodiment of the present disclosure.

FIG. 3 illustrates recommending a charging station using tendency data of a driver in a charging station recommendation apparatus and method according to an embodiment of the present disclosure.

With respect to the description of FIG. 3, contents that overlap with or correspond to the above-described contents will be briefly described or omitted.

In the following embodiments, operations S310 to S340 may be performed by at least one processor electrically connected to the data collection device, the data processing device, the data storage, and the data application device.

Referring to FIG. 3, in the charging station recommendation apparatus and method according to an embodiment, the processor may collect charging data in S310. In the present disclosure, the charging data may be referred to as the vehicle data.

According to an embodiment, the processor may collect the charging data corresponding to the vehicle driver being selected from the vehicle being charged at at least one charging station.

For example, the processor may receive an input of selecting the vehicle driver and collect the charging data for the selected vehicle driver once or more.

According to an embodiment, the processor may collect the charging data for each selected driver, which includes at least one of the remaining battery amount at the start of charging, the remaining battery amount at the end of charging, the estimated battery exhaustion distance at the start of charging, the estimated battery exhaustion distance at the end of charging, the required charging time, or the charger type.

For example, the charger type may include at least one of a super-fast type, a rapid type, and a slow type.

According to an embodiment, the processor may process the charging data in S320.

According to an embodiment, the processor may generate the driver tendency data based on the collected charging data.

According to an embodiment, the driver tendency data may include at least one of the charger type preferred by the driver, the charger connector type preferred by the driver, the estimated average battery exhaustion distance at a time point when charging of the vehicle is started by the driver, or the average charging time required to charge the vehicle by the driver.

According to an embodiment, the processor may recommend a charging station to the vehicle in S330.

According to an embodiment, when searching for a route corresponding to setting (or inputting) of a destination or waypoint, the processor may determine whether it is possible to reach the destination or waypoint based on the estimated current battery exhaustion distance.

According to an embodiment, the processor may select a recommended charging station (or an optimal charging station) when it is determined that it is impossible to reach the destination or waypoint. According to an embodiment, the processor may recommend one or more charging stations to the vehicle based on the driver tendency data.

According to an embodiment, the processor may provide at least one of the recommended route, the expected arrival time, and the required charging time to the vehicle. For example, the recommended route may include a recommended route to a destination or a waypoint including a charging station.

According to an embodiment, the processor may provide additional guidance to the vehicle after arrival at the destination in S340.

According to an embodiment, the processor may determine the estimated remaining battery exhaustion distance after the vehicle arrives at the destination.

According to an embodiment, after the vehicle arrives at at least one of the destination or waypoint, the processor may determine whether the vehicle is required to be charged before the next driving, based on the estimated battery exhaustion distance of the vehicle and the driver charging information.

According to an embodiment, the processor may compare the estimated remaining battery exhaustion distance of the vehicle with the estimated average battery exhaustion distance at the time point when the driver starts charging the vehicle, which is included in the driver charging information.

According to an embodiment, when the estimated remaining battery exhaustion distance of the vehicle is less than or equal to the estimated average battery exhaustion distance at the time point when the driver starts charging the vehicle, which is included in the driver charging information, the processor may determine that charging is required.

According to an embodiment, when it is determined that the vehicle is required to be charged, the processor may transmit the data for recommending charging to the vehicle to provide an additional charging need guidance.

For example, the charging need guidance may be provided in an audible form (e.g., sound or voice) or in a visual form (e.g., a pop-up).

Figure 4:
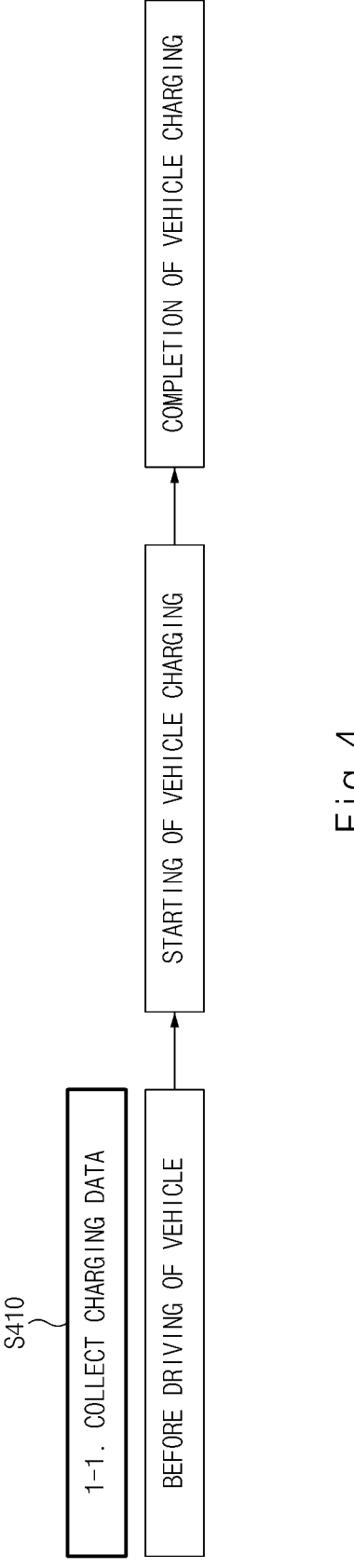
FIG. 4 illustrates collecting vehicle charging data in a charging station recommendation apparatus and method according to an embodiment of the present disclosure.

FIG. 4 illustrates collecting vehicle charging data in a charging station recommendation apparatus and method according to an embodiment of the present disclosure. With respect to the description of FIG. 4, contents that overlap with or correspond to the above-described contents will be briefly described or omitted.

In the following embodiments, step (or operation) S410 may be performed by at least one processor electrically connected to the data collection device, the data processing device, the data storage, and the data application device.

Referring to FIG. 4, in the charging station recommendation apparatus and method according to an embodiment, the processor may collect the charging data.

According to an embodiment, the processor may receive information on the selected driver from the vehicle before the vehicle starts to drive.

For example, when there are a plurality of drivers of the vehicle, the processor may receive information about the first driver selected from among the plurality of drivers.

According to an embodiment, the processor may receive an input for selecting a driver in conjunction with an audio, video, navigation (AVN) device provided in a vehicle.

According to an embodiment, the processor may collect (or obtain) the vehicle data after the vehicle starts being charged.

According to an embodiment, the processor may obtain the vehicle data from a time point when the charging connector is coupled to the vehicle.

For example, the vehicle data may include at least one of a charging start time, a remaining battery amount when charging is started, an estimated battery exhaustion distance when charging is started, or a connected charger type.

According to an embodiment, the processor may collect (or obtain) the vehicle data after charging of the vehicle is completed.

According to an embodiment, the processor may obtain the vehicle data until the time when the charging connector is separated from the vehicle.

For example, the vehicle data may include at least one of a charging completion time, a remaining battery amount at the end of charging, an estimated battery exhaustion distance at the end of charging, a vehicle type, model year of the vehicle, or a total driving distance of the vehicle.

According to an embodiment, the processor may store the collected vehicle data. For example, the processor may store the collected vehicle data in a memory for the profile of the selected driver. In addition, for example, the processor may transmit the collected vehicle data to the central management server.

Figure 5:
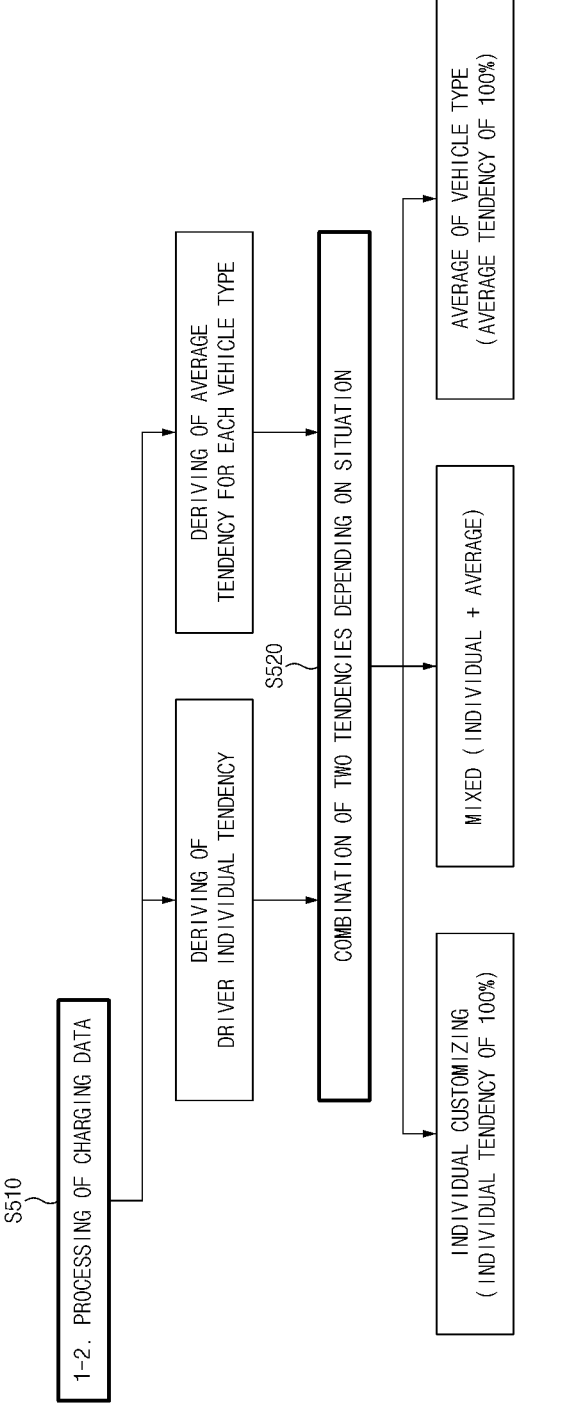
FIG. 5 illustrates processing charging data in a charging station recommendation apparatus and method according to an embodiment of the present disclosure.

FIG. 5 illustrates processing charging data in a charging station recommendation apparatus and method according to an embodiment of the present disclosure. With respect to the description of FIG. 5, contents that overlap with or correspond to the above-described contents will be briefly described or omitted.

In the following embodiments, steps (or operations) S5110 and S520 may be performed by at least one processor electrically connected to the data collection device, the data processing device, the data storage, and the data application device.

According to an embodiment, the processor may process the collected charging data in S510.

According to an embodiment, the processor may obtain (or derive) at least one of a driver's individual tendency or an average tendency for each vehicle type by processing the collected vehicle data.

According to an embodiment, the processor may obtain the driver's individual tendency by processing only the vehicle data for a selected driver.

According to an embodiment, the processor may obtain the driver's individual tendency based on at least one of the charging start time, the charging completion time, the required charging time, the remaining battery level at the start of charging, the remaining battery level at the end of charging, the estimated battery exhaustion distance at the start of charging, the estimated battery exhaustion distance at the end of charging, or a charger type for the selected driver.

According to an embodiment, the processor may assign (or allocate) a high weight to recently collected vehicle data. In detail, the processor may assign a higher (or larger) value to the second vehicle data collected after the first vehicle data is collected than the first vehicle data.

According to the above-described embodiment, the charging station recommendation apparatus according to the present disclosure may follow a change in driver's tendency by assigning (or allocating) a high weight to recently collected vehicle data.

According to an embodiment, the processor may derive the average tendency for each vehicle type by classifying and processing the vehicle data collected at at least one charging station by vehicle type.

According to an embodiment, the processor may process the collected vehicle data transmitted to a central management server.

According to an embodiment, the processor may classify the collected vehicle data based on the model year of the vehicle or the total driving distance of the vehicle for the same vehicle type.

According to an embodiment, the processor may obtain the average tendency for each vehicle type based on the vehicle data classified based on the model year of the vehicle or the total driving distance of the vehicle for the same vehicle type.

For example, the processor may obtain the average tendency for each vehicle type based on vehicle data including at least one of the remaining battery level, the estimated battery exhaustion distance, the required charging time, or the charger type.

According to an embodiment, the processor may determine an optimal charging station by using at least one of the driver's individual tendency and the average tendency for each vehicle type.

For example, the processor may determine the optimal charging station by using only the driver's individual tendency. In addition, for example, the processor may determine the optimal charging station by using only the average tendency for each vehicle type. In addition, for example, the processor may determine the optimal charging station by using both the driver's individual tendency and the average tendency for each vehicle type.

According to the above-described embodiment, the charging station recommendation apparatus according to the present disclosure may determine a charging station based on the driver's individual tendency or the average tendency for each vehicle type, thereby adaptively recommending an optimal charging station to the vehicle according to circumstances and needs.

Figure 6:
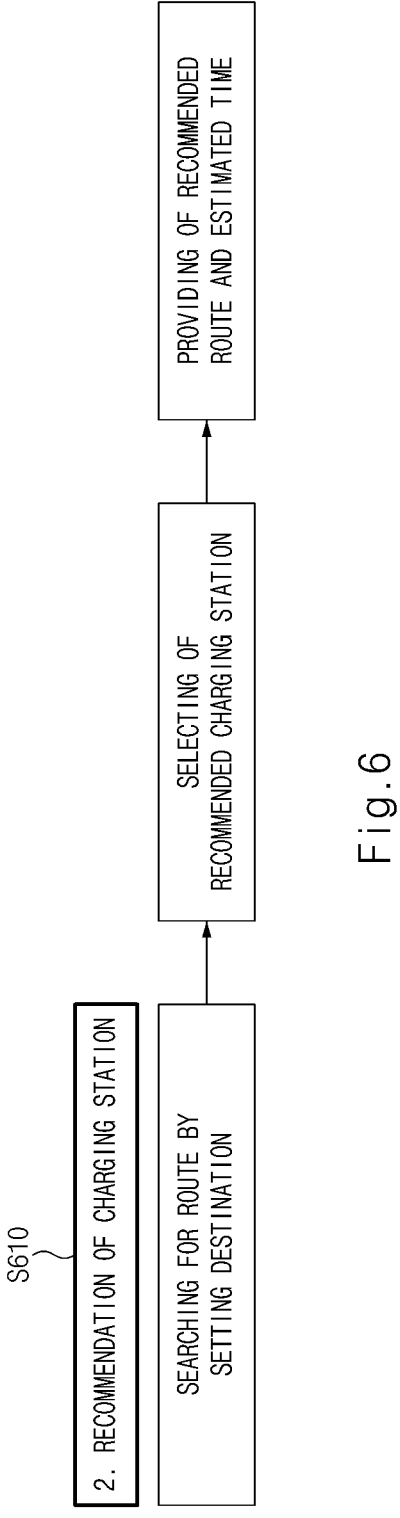
FIG. 6 illustrates recommending a charging station using driver charging information or vehicle charging information in a charging station recommendation apparatus and method according to an embodiment of the present disclosure.

FIG. 6 illustrates recommending a charging station using driver charging information or vehicle charging information in a charging station recommendation apparatus and method according to an embodiment of the present disclosure.

With respect to the description of FIG. 6, contents that overlap with or correspond to the above-described contents will be briefly described or omitted.

In the following embodiments, step (or operation) S610 may be performed by at least one processor electrically connected to the data collection device, the data processing device, the data storage, and the data application device.

According to an embodiment, the processor may recommend an optimal charging station to the vehicle in S610.

According to an embodiment, the processor may search for a route in response to setting (or inputting) of a destination or waypoint.

According to an embodiment, the processor may determine whether it is possible to reach the destination or waypoint based on the estimated current battery exhaustion distance.

According to an embodiment, when the estimated battery exhaustion distance of the vehicle is less than the distance between the current location of the vehicle and the destination or the current location of the vehicle and the waypoint, the processor may provide the charging station recommendation route.

According to an embodiment, when the estimated battery exhaustion distance of the vehicle is equal to or greater than the distance between the current location of the vehicle and the destination or the current location of the vehicle and the waypoint, the processor may start guiding a route to a destination or a waypoint.

According to an embodiment, the processor may select a candidate charging station from among at least one charging station near the route between the current location and destination of the vehicle or between the current location and waypoint of the vehicle.

According to an embodiment, the processor may select, as a candidate charging station, a charging station which is located within a threshold angle (e.g., 30 degrees) left and right based on the straight path from the current location of the vehicle to the destination or from the current location of the vehicle to the waypoint.

In this case, a candidate charging station may be selected based on at least one of the type of charger mainly used by the driver, the battery exhaustion distance at which the driver starts charging, the average charging time of the driver, or the type of the rechargeable battery connector preferred by the driver.

According to an embodiment, the processor may provide a route including a recommended charging station when providing the vehicle with the route to a destination or a waypoint.

According to an embodiment, the processor may provide the vehicle with a total estimated time required to reach the destination or waypoint. For example, the total estimated required time may include a driving time of the vehicle and a charging time of the vehicle. In this case, the charging time of the vehicle may include an average charging time according to the driver's tendency.

Figure 7:
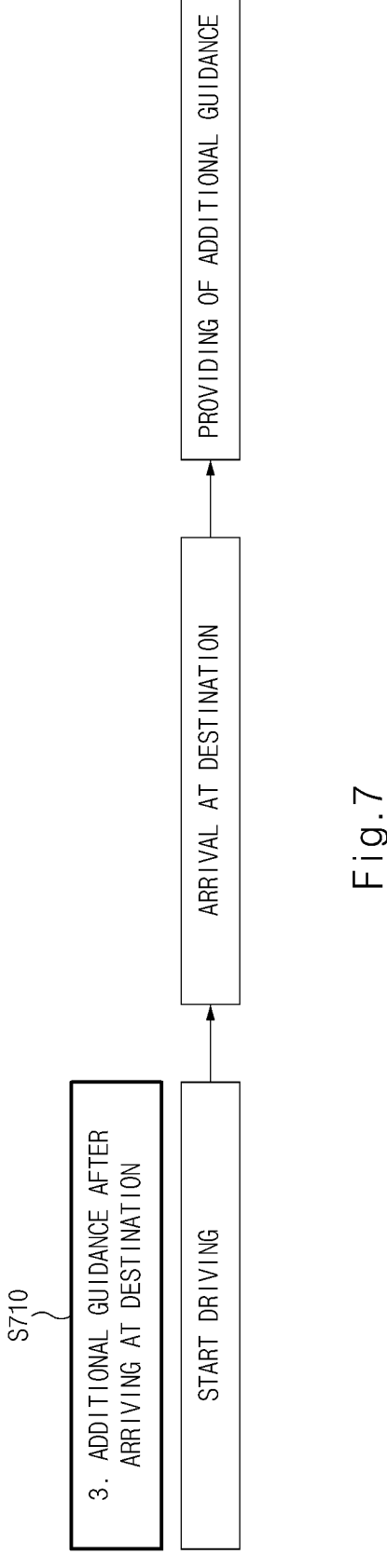
FIG. 7 illustrates providing additional guidance after a vehicle arrives at a destination in a charging station recommendation apparatus and method according to an embodiment of the present disclosure.

FIG. 7 illustrates providing additional guidance after a vehicle arrives at a destination in a charging station recommendation apparatus and method according to an embodiment of the present disclosure.

With respect to the description of FIG. 7, contents that overlap with or correspond to the above-described contents will be briefly described or omitted.

In the following embodiments, step (or operation) S710 may be performed by at least one processor electrically connected to the data collection device, the data processing device, the data storage, and the data application device.

According to an embodiment, in S710, the processor may provide additional guidance to the vehicle after the vehicle arrives at the destination.

According to an embodiment, when it is determined that the vehicle arrives at the destination after starting driving, the processor may compare the remaining battery exhaustion distance of the vehicle after arrival with the battery exhaustion distance at which the driver starts charging on average.

According to an embodiment, when it is determined that the remaining battery exhaustion distance of the vehicle after arrival is equal to or greater than the battery exhaustion distance at which the driver starts charging on average, the processor may guide the current remaining battery exhaustion distance.

According to an embodiment, when it is determined that the remaining battery exhaustion distance of the vehicle after arrival is less than the battery exhaustion distance at which the driver starts charging on average, the processor may provide a guide (or recommendation) that charging is required before the next driving.

According to an embodiment, the charging need guidance may be provided in the form of a voice (e.g., it is better to charge the vehicle in advance before the next driving) or a pop-up.

Figure 8:
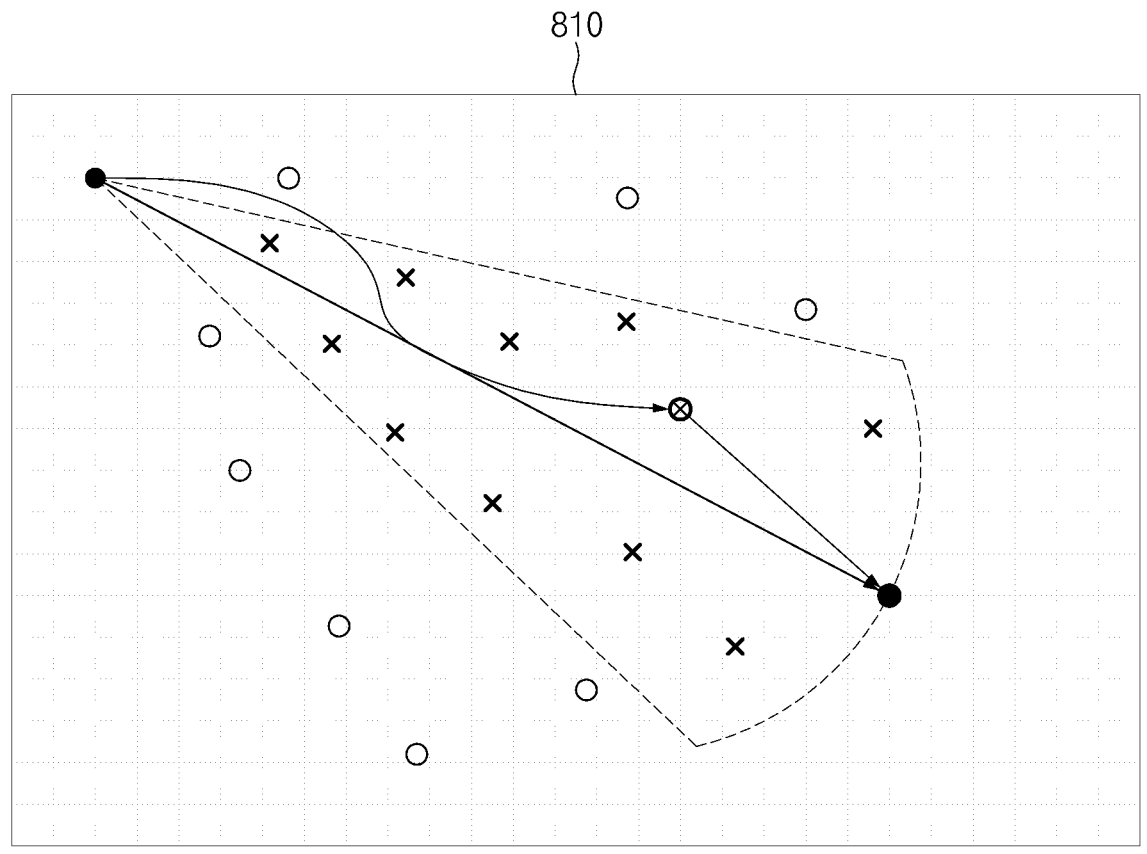
FIG. 8 illustrates selecting an optimal charging station using a database in a charging station recommendation apparatus and method according to an embodiment of the present disclosure.

FIG. 8 illustrates selecting an optimal charging station using a database 810 in a charging station recommendation apparatus and method according to an embodiment of the present disclosure.

Referring to FIG. 8, in the charging station recommendation apparatus and method according to an embodiment, the processor may determine an optimal charging station by using the database 810 including the current location of the vehicle and a straight path to the destination.

According to an embodiment, the processor may select, as a candidate charging station, at least one charging station among the plurality of charging stations, which is located within a threshold angle (e.g., 30 degrees) left and right based on the straight path from the current location of the vehicle to the destination or from the current location of the vehicle to the waypoint.

According to an embodiment, the processor may determine an optimal charging station among at least one candidate charging station.

According to the above-described embodiment, the charging station recommendation apparatus according to the present disclosure may determine an optimal charging station among charging stations located within the threshold angle left and right on the basis of the straight path from the current location of the vehicle to the destination, so that it is possible to prevent the vehicle from detouring too far when the vehicle travels to the destination.

Figure 9:
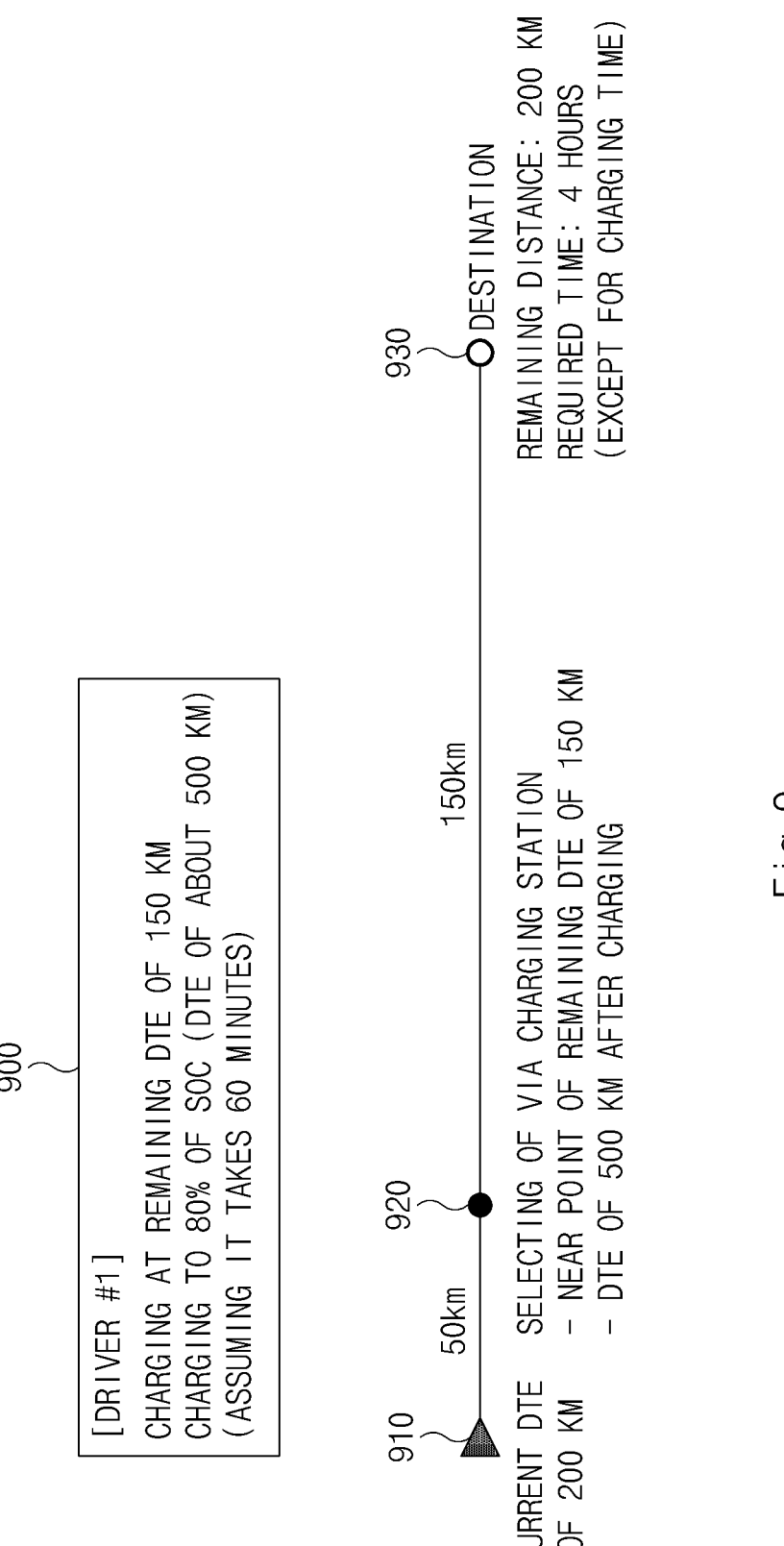
FIG. 9 is a view illustrating a first example of recommending a charging station using driver charging information in a charging station recommendation apparatus and method according to an embodiment of the present disclosure.

FIG. 9 is a view illustrating a first example of recommending a charging station using driver charging information in a charging station recommendation apparatus and method according to an embodiment of the present disclosure.

Referring to FIG. 9, in the charging station recommendation apparatus and method according to an embodiment, when it is determined that it is impossible to reach a destination 930 in response to setting of the destination 930 of a vehicle 910, the charging station recommendation apparatus may recommend an optimal charging station to the vehicle 910 based on the driver charging information.

According to an embodiment, when the estimated battery exhaustion distance of the vehicle is equal to or less than the remaining distance to the destination 930, the charging station recommendation apparatus may determine that it is impossible to reach the destination 930.

For example, the remaining distance to the set destination 930 may be 200 km, and the arrival time may be 2 hours. In addition, for example, the estimated battery exhaustion distance of the vehicle 910 may be 200 km. In this case, the charging station recommendation apparatus may determine that the vehicle 910 is required to be charged and may provide a route including a charging station.

According to an embodiment, the charging station recommendation apparatus may recommend a first charging station 920 to the vehicle 910 based on the driver charging information (or driver tendency data).

According to an embodiment, the driver charging information may include the average battery exhaustion distance at which the driver starts charging, the average remaining battery amount when the driver completes charging, or the average required charging time of the driver.

For example, the average battery exhaustion distance at which the driver starts charging may be 150 km, the average remaining battery exhaustion distance when the driver completes charging may be 500 km, and the average required charging time of the driver may be 60 minutes.

In this case, the charging station recommendation apparatus may recommend the first charging station 920 to the vehicle as an optimal charging station.

For example, the charging station recommendation apparatus may recommend the first charging station 920 located near the point at which the battery exhaustion distance of the vehicle becomes 150 km to the vehicle as an optimal charging station.

In addition, for example, the charging station recommendation apparatus may recommend the first charging station 920 as an optimal charging station such that the total time required to reach the destination is within 3 hours, based on the fact that the time required to arrive at the destination is 2 hours and the average required charging time of the driver is 60 minutes.

According to an embodiment, the charging station recommendation apparatus may guide the remaining battery exhaustion distance when the vehicle arrives at a destination. For example, the charging station recommendation apparatus may inform that the remaining battery exhaustion distance is 350 km when the vehicle arrives at the destination.

Figure 10:
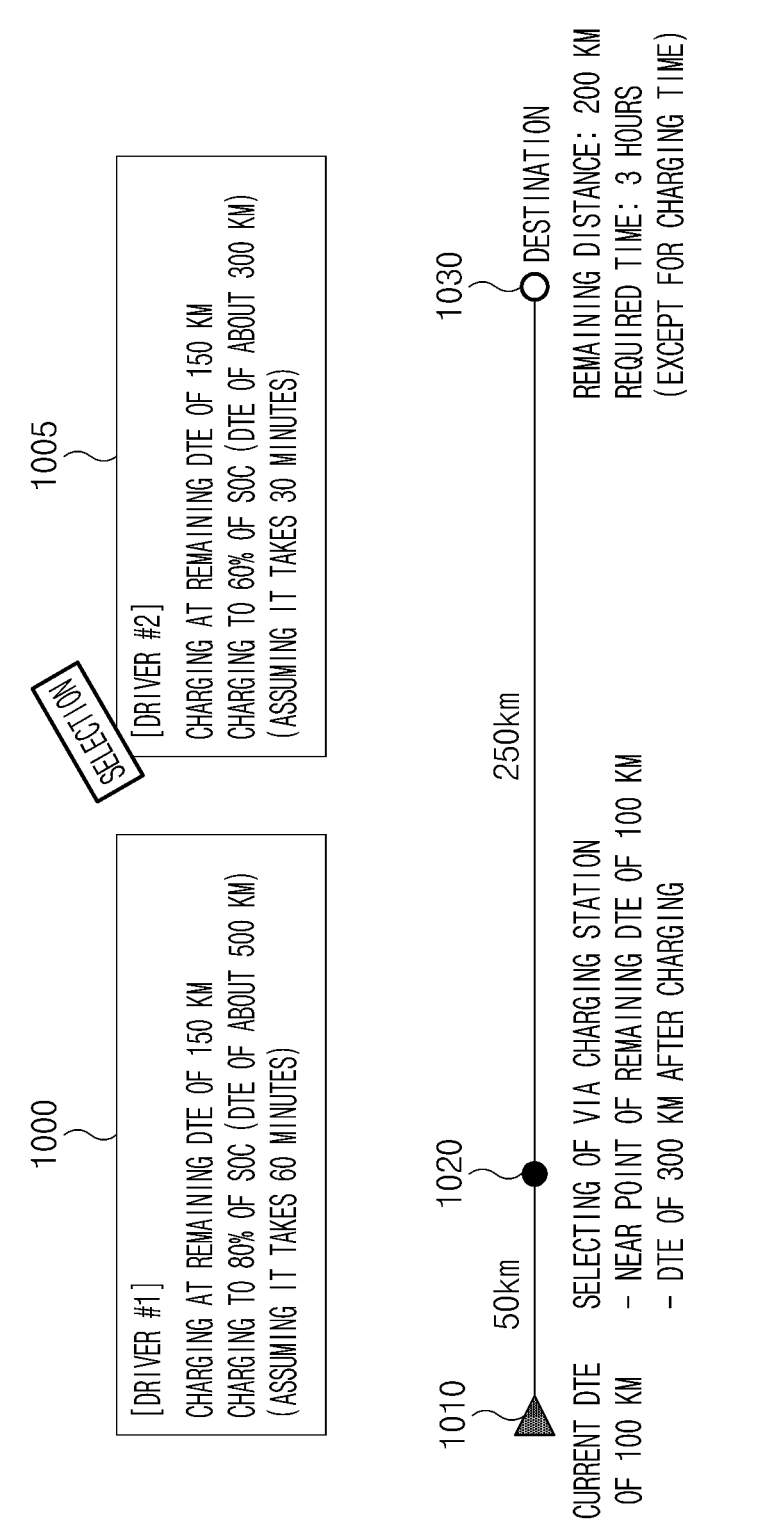
FIG. 10 is a view illustrating a second example of recommending a charging station using driver charging information in a charging station recommendation apparatus and method according to an embodiment of the present disclosure.

FIG. 10 is a view illustrating a second example of recommending a charging station using driver charging information in a charging station recommendation apparatus and method according to an embodiment of the present disclosure.

Referring to FIG. 10, in the charging station recommendation apparatus and method according to an embodiment, the charging station recommendation apparatus may recommend an optimal charging station based on the driver charging information of a selected driver when there are a plurality of drivers of a vehicle.

For example, the average battery exhaustion distance at which the first driver among the plurality of drivers starts charging is 150 km, and when the driver completes charging, the average remaining battery exhaustion distance is 500 km, and the average charging time of the driver is 60 minutes.

In addition, for example, the average battery exhaustion distance at which the second driver among the plurality of drivers starts charging is 100 km, the average remaining battery exhaustion distance may be 300 km when the driver completes charging, and the average required charging time of the driver may be 30 minutes.

According to an embodiment, in response to selecting of the second driver, the charging station recommendation apparatus may recommend an optimal charging station to a vehicle 1010 based on second driver charging information on the second driver.

According to an embodiment, when it is determined that it is impossible to reach a destination 1030 of the vehicle 1010 in response to setting of the destination 1030, the charging station recommendation apparatus may recommend an optimal charging station to the vehicle 1010.

According to an embodiment, when the estimated battery exhaustion distance of the vehicle is equal to or less than the remaining distance to the destination 1030, the charging station recommendation apparatus may determine that it is impossible to reach the destination 1030.

For example, the remaining distance to the set destination 1030 may be 200 km, and the arrival time may be 3 hours. In addition, for example, the estimated battery exhaustion distance of the vehicle 1010 may be 150 km. In this case, the charging station recommendation apparatus may determine that the vehicle 1010 is required to be charged and may provide a route including a charging station.

According to an embodiment, the charging station recommendation apparatus may recommend a second charging station 1020 to the vehicle 1010 based on the second driver charging information (or second driver tendency data).

For example, the charging station recommendation apparatus may recommend the second charging station 1020 located near the point at which the battery exhaustion distance of the vehicle is 100 km to the vehicle as an optimal charging station.

In addition, for example, the charging station recommendation apparatus may recommend the second charging station 1020 as an optimal charging station such that the total time required to reach the destination is within 3 hours and 30 minutes, based on the fact that the time required to arrive at the destination is 3 hours and the average required charging time of the driver is 30 minutes.

According to an embodiment, when the remaining battery exhaustion distance is less than the average battery exhaustion distance at which the driver starts charging when the vehicle arrives at the destination, the charging station recommendation apparatus may provide a guide for recommending additional charging after arriving at the destination.

For example, the charging station recommendation apparatus may recommend additional charging in the form of a pop-up or voice (e.g., it is better to charge the vehicle in advance before the next driving) along with guiding that the remaining battery exhaustion distance is 50 km upon arrival at the destination.

Figure 11:
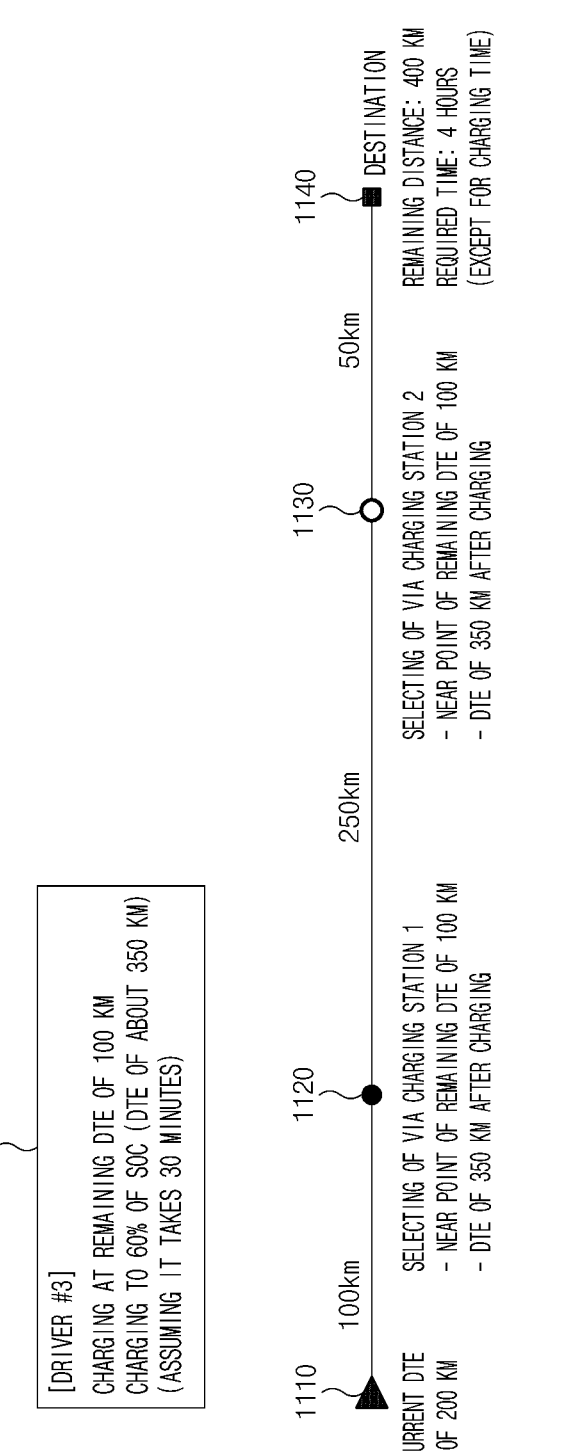
FIG. 11 is a view illustrating a third example of recommending a charging station using driver charging information in a charging station recommendation apparatus and method according to an embodiment of the present disclosure.

FIG. 11 is a view illustrating a third example of recommending a charging station using driver charging information in a charging station recommendation apparatus and method according to an embodiment of the present disclosure.

Referring to FIG. 11, in the charging station recommendation apparatus and method according to an embodiment, when it is determined that it is impossible to reach a destination 1140 in response to setting of the destination 1140 of a vehicle 1110, the charging station recommendation apparatus may recommend an optimal charging station to the vehicle 1110 based on the driver charging information.

According to an embodiment, when the estimated battery exhaustion distance of the vehicle is equal to or less than the remaining distance to the destination 1140, the charging station recommendation apparatus may determine that it is impossible to reach the destination 1140.

For example, the remaining distance to the set destination 1140 may be 400 km, and the arrival time may be 4 hours. In addition, for example, the estimated battery exhaustion distance of the vehicle 1110 may be 200 km. In this case, the charging station recommendation apparatus may determine that the vehicle 1110 is required to be charged and may provide a route including a charging station.

According to an embodiment, the charging station recommendation apparatus may recommend third and fourth charging stations 1120 and 1130 to the vehicle 1110 based on the driver charging information (or driver tendency data).

According to an embodiment, the driver charging information may include the average battery exhaustion distance at which the driver starts charging, the average remaining battery amount when the driver completes charging, or the average required charging time of the driver.

For example, the average battery exhaustion distance at which the driver starts charging may be 100 km, the average remaining battery exhaustion distance when the driver completes charging may be 350 km, and the average required charging time of the driver may be 30 minutes.

In this case, the charging station recommendation apparatus may recommend the third charging station 1120 to the vehicle as an optimal charging station.

For example, the charging station recommendation apparatus may recommend the third charging station 1120 located near the point at which the battery exhaustion distance of the vehicle becomes 100 km to the vehicle as an optimal charging station.

According to an embodiment, even when charging is completed at the third charging station 1120, the charging station recommendation apparatus may recommend the fourth charging station 1130 to the vehicle together with the third charging station 1120 when it is determined that the estimated remaining battery exhaustion distance when arriving at the destination is less than the average battery exhaustion distance at which the driver starts charging.

For example, the battery exhaustion distance of the vehicle after charging at the third charging station 1120 may be 350 km. In this case, when the estimated battery exhaustion distance upon arrival to the destination is 50 km, because the average battery exhaustion distance at which the driver starts charging is less than 100 km, the fourth charging station 1130 may be additionally recommended to the vehicle.

For example, after charging is completed at the third charging station 1120, the charging station recommendation apparatus may additionally recommend the fourth charging station 1130 located near the point where the battery exhaustion distance of the vehicle is 100 km to the vehicle.

In addition, for example, the charging station recommendation apparatus may recommend the third and fourth charging stations 1120 and 1130 to the vehicle such that the total time required to reach the destination is within 5 hours, based on the fact that the time required to arrive at the destination is 4 hours and the average required charging time of the driver is 30 minutes.

According to an embodiment, the charging station recommendation apparatus may guide the remaining battery exhaustion distance when the vehicle arrives at a destination. For example, the charging station recommendation apparatus may inform that the remaining battery exhaustion distance is 300 km when the vehicle arrives at the destination.

Figures 12A, 12B:
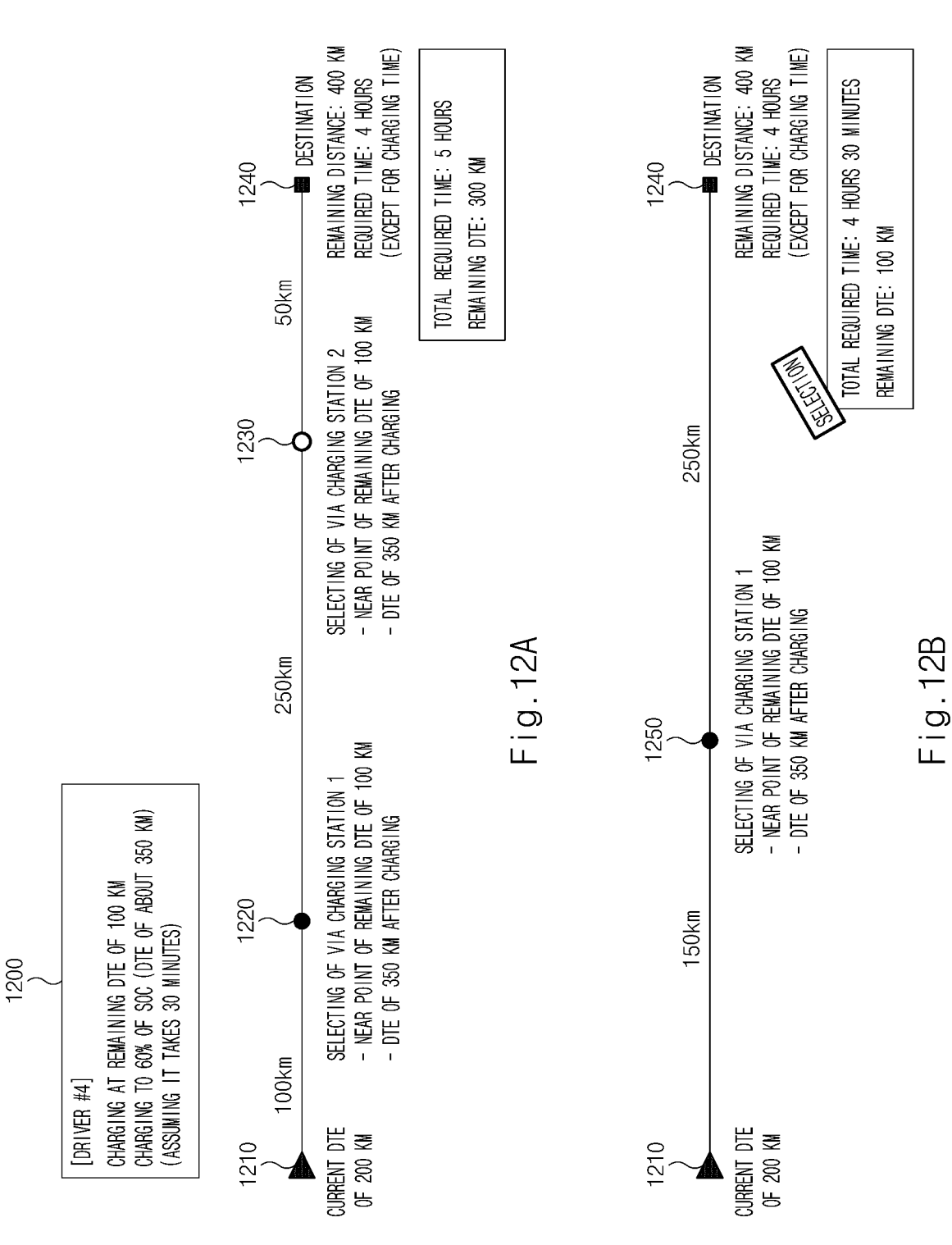
FIG. 12A illustrates recommending an additional charging station together with an optimal charging station determined by using driver charging information in a charging station recommendation apparatus and method according to an embodiment of the present disclosure.
FIG. 12B illustrates recommending an additional charging station together with an optimal charging station determined by using driver charging information in a charging station recommendation apparatus and method according to an embodiment of the present disclosure.

FIGS. 12A and 12B illustrate recommending an additional charging station together with an optimal charging station determined by using driver charging information in a charging station recommendation apparatus and method according to an embodiment of the present disclosure.

Referring to FIG. 12, in the charging station recommendation apparatus and method according to an embodiment, when it is determined that it is impossible to reach a destination 1240 in response to setting of the destination 1240 of a vehicle 1210, the charging station recommendation apparatus may recommend an optimal charging station to the vehicle 1210 based on the driver charging information.

In detail, after at least one of the destination or waypoint of the vehicle is set, when it is determined that the vehicle is required to be charged twice or more, or the distance between the current location and destination of the vehicle or between the current location and waypoint of the vehicle is equal to or greater than a threshold distance, the charging station recommendation apparatus may recommend an optimal charging station to the vehicle based on average data for each vehicle type in addition to the driver tendency data.

According to an embodiment, when the estimated battery exhaustion distance of the vehicle is equal to or less than the remaining distance to the destination 1240, the charging station recommendation apparatus may determine that it is impossible to reach the destination 1240.

For example, the remaining distance to the set destination 1240 may be 400 km, and the arrival time may be 4 hours. In addition, for example, the estimated battery exhaustion distance of the vehicle 1210 may be 200 km. In this case, the charging station recommendation apparatus may determine that the vehicle 1210 is required to be charged and may provide a route including a charging station.

Referring to FIG. 12A, in the charging station recommendation apparatus and method according to an embodiment, it is possible to recommend fifth and sixth charging stations 1220 and 1230 to the vehicle 1210 based on the driver tendency data.

The content of selecting the fifth charging station 1220 and the sixth charging station 1230 in FIG. 12A is the third charging station 1120 and the fourth charging station 1130 in the third embodiment of FIG. 11. Since it overlaps with the selected content, the description of the third embodiment of FIG. 11 is replaced.

Referring to FIG. 12B, in the charging station recommendation apparatus and method according to an embodiment, the charging station recommendation apparatus may recommend a seventh charging station 1250 to the vehicle 1210 based on the average data for each vehicle type.

According to an embodiment, the charging station recommendation apparatus may determine, as the optimal charging station, the seventh charging station 1250 based on the average data for each vehicle type generated based on at least one of the average model year of other vehicles of the same type as the vehicle 1210 or the average total driving distance of other vehicles of the same type as the vehicle 1210.

For example, the charging station recommendation apparatus may recommend the seventh charging station 1250 located near the point where the battery exhaustion distance of the vehicle is 50 km to the vehicle, based on the average data for each vehicle type.

In addition, for example, the charging station recommendation apparatus may recommend the seventh charging station 1250 to the vehicle such that the total time required to reach the destination is within 4 hours and 30 minutes, based on the fact that the time required to arrive at the destination is 4 hours and the average required charging time of the driver is 30 minutes.

According to an embodiment, the charging station recommendation apparatus may guide the remaining battery exhaustion distance when the vehicle arrives at a destination. For example, the charging station recommendation apparatus may inform that the remaining battery exhaustion distance is 100 km when the vehicle arrives at the destination.

Figure 13:
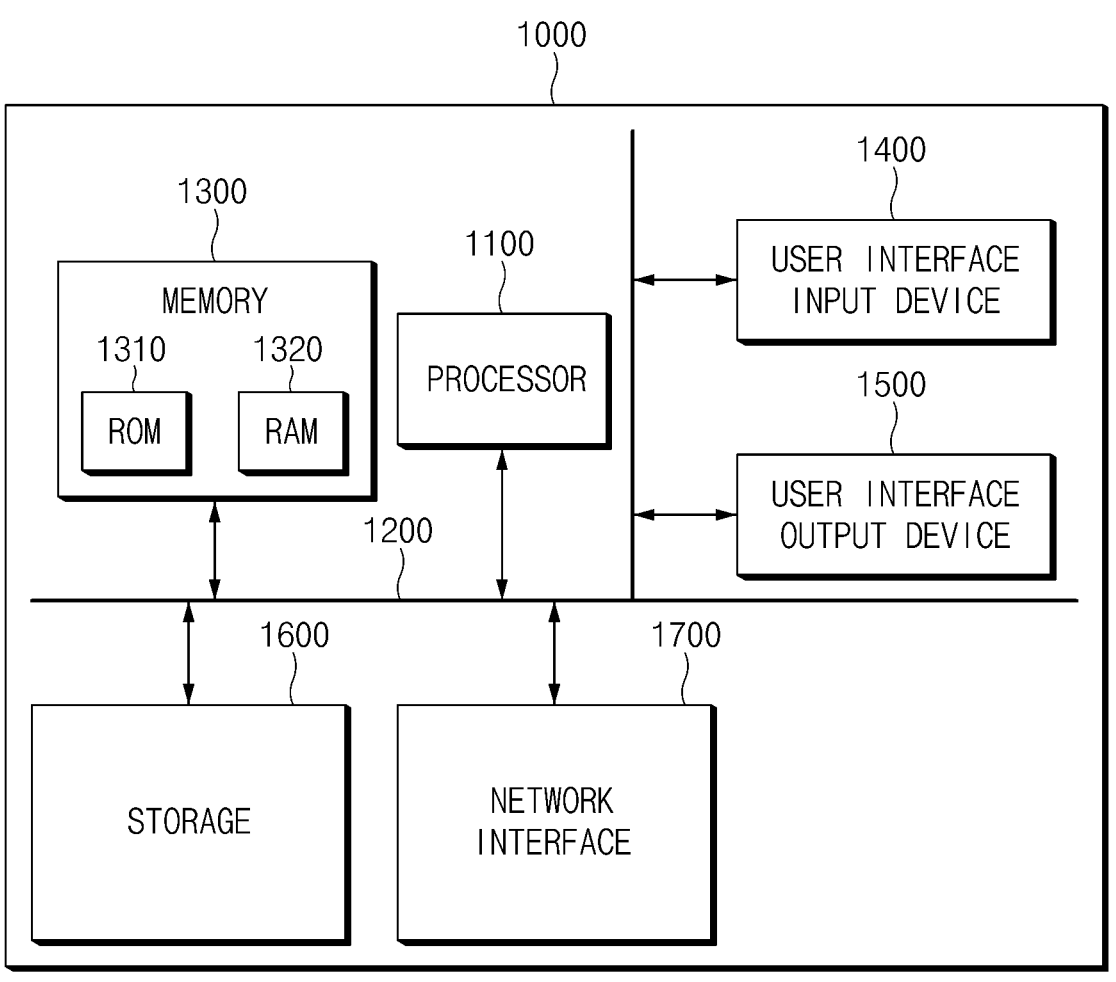
FIG. 13 is a block diagram illustrating a computing system related to a charging station recommendation apparatus and method according to an embodiment of the present disclosure.

FIG. 13 is a block diagram illustrating a computing system related to a charging station recommendation apparatus and method according to an embodiment of the present disclosure.

Referring to FIG. 13, a computing system 1000 related to the charging station recommendation apparatus and method may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random. Access Memory).

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The effect of the charging station recommendation apparatus and method according to the present disclosure will be described as follows.

According to at least one of the embodiments of the present disclosure, it is possible to provide a convenient driving experience to the driver by providing a driver-customized route rather than simply fixed logic.

In addition, according to at least one of the embodiments of the present disclosure, the system may actively identify the driver's tendency without receiving a separate driver input by collecting data during normal vehicle charging.

In addition, according to at least one of the embodiments of the present disclosure, it is possible to provide an optimal route to the driver in various manners in consideration of the driver's tendency and the number of charging times according to the route situation.

In addition, various effects that are directly or indirectly understood through the present disclosure may be provided.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A charging station recommendation apparatus comprising:
   a data collection device configured to collect vehicle data of a vehicle charged by at least one charging station at least once;
   a data processing device configured to generate driver charging information and/or vehicle charging information based on the collected vehicle data; and
   a data application device configured to recommend an optimal charging station based on the driver charging information and/or the vehicle charging information;
   wherein the data processing device is further configured to:
      assign different values to first vehicle data and second vehicle data from among the vehicle data collected at least once, the second vehicle data being collected after the first vehicle data; and
      generate the driver charging information and/or the vehicle charging information based on the values assigned to the first vehicle data and the second vehicle data.

2. The charging station recommendation apparatus of claim 1,
   wherein the data collection device is further configured to obtain the vehicle data from a time point when a charging connector is coupled to the vehicle to a time point when the charging connector is separated from the vehicle, and
   wherein the vehicle data includes at least one of: charging start time, charging completion time, a remaining battery level, an estimated battery exhaustion distance, a remaining hydrogen amount, a remaining driving distance, a charger type, a type of the vehicle, a model year of the vehicle, and/or a total driving distance of the vehicle.

3. The charging station recommendation apparatus of claim 1,
   wherein the driver charging information includes at least one of: a charger type preferred by the driver, a charger connector type preferred by the driver, an estimated average battery exhaustion distance at a time point when charging of the vehicle is started according to the driver, and/or an average charging time of the vehicle according to the driver, and wherein the vehicle charging information includes at least one of: the estimated average battery exhaustion distance at the time point when the charging of the vehicle is started, and/or the average charging time of the vehicle according to at least one of: a type of the vehicle, model year of the vehicle, and/or a total driving distance of the vehicle.

4. The charging station recommendation apparatus of claim 1, wherein the data application device is further configured to determine the optimal charging station from among a plurality of charging stations located in a range that is within a threshold angle left and right based on a straight path between a current location and a destination of the vehicle or the current location and a waypoint of the vehicle.

5. The charging station recommendation apparatus of claim 1, further comprising:

a data storage configured to store at least one of: the driver charging information and/or the vehicle charging information, wherein the data storage is configured to store driver charging information of each driver of a plurality of drivers of the vehicle, and wherein the data application device is further configured to recommend the optimal charging station based on driver charging information of a first driver stored in the data storage in response to selecting the first driver from among the plurality of drivers.

6. The charging station recommendation apparatus of claim 1, wherein the data application device is further configured to provide data for recommending charging of the vehicle when it is determined that charging is necessary before a next driving event based on an estimated battery exhaustion distance of the vehicle and the driver charging information after the vehicle arrives at either one of: a destination or a waypoint.

7. The charging station recommendation apparatus of claim 6, wherein the data application device is further configured to determine that the charging is necessary if the estimated battery exhaustion distance of the vehicle is less than an estimated average battery exhaustion distance at a time point when charging of the vehicle is started according to the driver charging information, and wherein the data for recommending charging includes at least one of: sound data and/or screen data for recommending charging.

8. The charging station recommendation apparatus of claim 1, wherein the data application device is further configured to recommend the optimal charging station if an estimated battery exhaustion distance of the vehicle is less than: a distance between a current location of the vehicle and a destination of the vehicle and/or the current location of the vehicle and a waypoint of the vehicle.

9. The charging station recommendation apparatus of claim 1, wherein, if it is determined: (a) that the vehicle needs to be charged twice or more, (b) a distance between a current location of the vehicle and a destination of the vehicle is equal to or greater than a threshold distance and/or (c) the current location of the vehicle and a waypoint of the vehicle is equal to or greater than a threshold distance, the data application device is configured to:

determine an additional charging station by using charging information for each type of vehicle generated based on at least one of: an average model year of another vehicle of a same type as the vehicle, and/or an average total driving distance of the another vehicle; and recommend the additional charging station in addition to the optimal charging station.

10. A method of recommending a charging station, the method comprising:

collecting, by a data collection device, vehicle data of a vehicle charged by at least one charging station at least once;

generating, by a data processing device, driver charging information and/or vehicle charging information based on the collected vehicle data; and recommending, by a data application device, an optimal charging station based on the driver charging information and/or the vehicle charging information, wherein the generating of the driver charging information and/or the vehicle charging information step includes:

assigning, by the data processing device, different values to first vehicle data and second vehicle data from among the vehicle data collected at least once the second vehicle data being collected after the first vehicle data; and generating, by the data processing device, the driver charging information and/or the vehicle charging information based on the values assigned to the first vehicle data and the second vehicle data.

11. The method of claim 10, wherein the collecting vehicle data of the vehicle step includes:

obtaining, by the data collection device, the vehicle data from a time point when a charging connector is coupled to the vehicle to a time point when the charging connector is separated from the vehicle, and wherein the vehicle data includes at least one of: charging start time, charging completion time, a remaining battery level, an estimated battery exhaustion distance, a remaining hydrogen amount, a remaining driving distance, a charger type, a type of the vehicle, a model year of the vehicle, and/or a total driving distance of the vehicle.

12. The method of claim 10, wherein the driver charging information includes at least one of a charger type preferred by the driver, a charger connector type preferred by the driver, an estimated average battery exhaustion distance at a time point when charging of the vehicle is started according to the driver, and/or an average charging time of the vehicle according to the driver, and wherein the vehicle charging information includes at least one of: the estimated average battery exhaustion distance at the time point when the charging of the vehicle is started, and/or the average charging time of the vehicle according to at least one of: a type of the vehicle, a model year of the vehicle, and/or a total driving distance of the vehicle.

13. The method of claim 10, wherein the recommending of the optimal charging station step includes:

determining, by the data application device, the optimal charging station from among a plurality of charging stations located in a range that is within a threshold angle left and right based on a straight path between a current location and a destination of the vehicle or the current location and a waypoint of the vehicle.

14. The method of claim 10, further comprising:

storing, by a data storage, at least one of: the driver charging information and/or the vehicle charging information, wherein the recommending of the optimal charging station step includes:

recommending, by the data application device, the optimal charging station based on driver charging information of a first driver stored in the data storage in response to selecting the first driver from among the plurality of drivers.

15. The method of claim 10, further comprising:

providing, the data application device, data for recommending charging of the vehicle when it is determined that charging is necessary before a next driving event based on an estimated battery exhaustion distance of the vehicle and the driver charging information after the vehicle arrives at either one of: a destination or a waypoint.

16. The method of claim 15, wherein the providing of the data for recommending charging to the vehicle step includes:

determining, by the data application device, that the charging is necessary if the estimated battery exhaustion distance of the vehicle is less than an estimated average battery exhaustion distance at a time point when charging of the vehicle is started according to the driver charging information, and wherein the data for recommending charging includes at least one of: sound data and/or screen data for recommending charging.

17. The method of claim 10, wherein the recommending of the optimal charging station step includes:

recommending, by the data application device, the optimal charging station if an estimated battery exhaustion distance of the vehicle is less than: a distance between a current location of the vehicle and a destination of the vehicle and/or the current location of the vehicle and a waypoint of the vehicle.

18. The method of claim 10, further comprising:

determining, by the data application device, an additional charging station if it is determined: (a) that the vehicle needs to be charged twice or more, (b) a distance between a current location of the vehicle and a destination of the vehicle is equal to or greater than a threshold distance, and/or (c) the current location of the vehicle and a waypoint of the vehicle is equal to or greater than a threshold distance, wherein the determining an additional charging step includes: using charging information for each type of vehicle generated based on at least one of: an average model year of another vehicle of a same type as the vehicle and/or an average total driving distance of the another vehicle; and recommending, by the data application device, the additional charging station in addition to the optimal charging station.

* * * * *